(12) United States Patent
Xu et al.

(10) Patent No.: US 6,402,313 B1
(45) Date of Patent: Jun. 11, 2002

(54) SUBSTRATE REACTIVE PRINTING PROCESS

(75) Inventors: Ming Xu; Kimberlee Thompson; Barbara Wagner, all of Mt. Pleasant, SC (US)

(73) Assignee: Sawgrass Systems, Inc., Mt. Pleasant, SC (US)

( * ) Notice: Subject to any disclaimer, the term of this patent is extended or adjusted under 35 U.S.C. 154(b) by 0 days.

(21) Appl. No.: 09/156,871

(22) Filed: Sep. 18, 1998

Related U.S. Application Data

(63) Continuation-in-part of application No. 09/073,963, filed on May 6, 1998, now abandoned.

(51) Int. Cl.[7] .............................. B41J 2/17; B41J 2/01
(52) U.S. Cl. ......................................... 347/96; 347/103
(58) Field of Search ........................... 347/96, 98, 100, 347/105, 103; 346/140.1; 400/120.02; 106/31.27, 31.6, 31.12

(56) References Cited

U.S. PATENT DOCUMENTS

| | | | |
|---|---|---|---|
| 4,058,644 A | 11/1977 | DeVries | |
| 4,078,886 A | 3/1978 | DeFago | |
| 4,605,418 A | 8/1986 | Christie et al. | |
| 4,694,302 A | * 9/1987 | Hackleman et al. | 347/96 |
| 5,411,931 A | 5/1995 | Kung et al. | |
| 5,431,501 A | * 7/1995 | Hale et al. | 400/120.02 |
| 5,470,818 A | 11/1995 | Nakamura et al. | |
| 5,556,935 A | 9/1996 | Traubel et al. | |
| 5,607,482 A | 3/1997 | Reiff et al. | |
| 5,645,888 A | 7/1997 | Titterington, et al. | |
| 5,646,090 A | 7/1997 | Tamura et al. | |
| 5,665,676 A | 9/1997 | Nakamura et al. | |
| 5,748,204 A | * 5/1998 | Harrison | 347/2 |
| 6,150,008 A | * 11/2000 | Nakayama et al. | 428/195 |

* cited by examiner

*Primary Examiner*—John Barlow
*Assistant Examiner*—M. Brooke
(74) *Attorney, Agent, or Firm*—B. Craig Killough

(57) ABSTRACT

A method of printing using an ink or meltable ink layer which comprises dyes, pigments or other colorants. Bonding and/or crosslinking of the colorants is provided by the reaction between compounds selected from each of two chemical groups. The first group comprises compounds with functional groups capable of reacting with active hydrogen. The second group comprises compounds with functional groups containing active hydrogen, or compounds with functional groups containing active hydrogen after a conversion process. Either the first group or the second group is present in the ink, and an image is printed with the ink onto a substrate. The substrate comprises either the first or second group, as appropriate, to set up a later reaction with the ink. The reaction is delayed until the image is subsequently transferred to another substrate or is permanently fixed on the substrate, by the presence of protecting or blocking agents, which are removed by the application of heat or other energy. Upon reaction, the colorant is bonded to the substrate.

30 Claims, 2 Drawing Sheets

SUBSTRATE REACTIVE PRINTING PROCESS

This application is a continuation-in-part of application Ser. No. 09/073,963 filed May 6, 1998 abandoned.

FIELD OF THE INVENTION

This invention relates to digital printing methods generally, and is more specifically directed to a method of digital printing of ink onto a substrate, and subsequently reacting the ink to permanently fix the printed image.

BACKGROUND OF THE INVENTION

Words and designs are frequently printed onto textiles, including clothing, paper, wood, plastic, metal and other substrates. A common method of applying full color designs to substrates includes the use of silk screens and mechanically bonded thermal transfers. Silk screen processes are well known in the art, and an example of a mechanical thermal process for textile materials is described in Hare, U.S. Pat. No. 4,224,358.

The use of digital computer technology allows virtually instantaneous printing of images. For example, a video camera or scanner may be used to capture an image to a computer. The captured image may be printed by a computer driven printer, such as a thermal, ink jet or laser printer. Computer driven printers are readily available which will print in multiple colors.

A process of thermal transfers wherein the ink mechanically bonds to the substrate is described in Hare, U.S. Pat. No. 4,773,953. The resulting mechanical image, as transferred, is a surface bonded image with a raised, plastic like feel to the touch. The resulting printed image is stiff to the feel, has poor dimensional stability when stretched and poor color range.

Conventional heat-melt thermal printing uses primarily non-active wax materials such as hydrocarbon wax, carnauba wax, ester wax, paraffin wax, etc. as heat-melt material. Though these wax or wax-like materials serve the purpose of heat-melt very well, they present problems when the product is used in a further transfer process, especially when the image is transferred to a fibrous material, such as a textile. The conventional wax materials are not chemically bonded or otherwise permanently bonded to the substrate, but are temporarily and loosely bound to the final substrate by the melting of wax during the transfer process. The resulting image is not durable, with the wax materials being washed away during laundering of textile substrates on which the image is transferred, particularly if hot water is used, along with the dyes or colorants which form the image in the thermal ink layer. Since, in most cases, the ink layer composition has a major percentage of wax or wax-like material, and the colorants used in such composition are either wax soluble and/or completely dispersed in wax material, the associated problems of poor wash fastness, color fastness, and poor thermal stability, of the final product result in rapid and severe image quality deterioration during the usage of the product.

Heat activated, or sublimation, transfer dye solids change to a gas at about 400°F., and have a high affinity for polyester at the activation temperature. Once the gassification bonding takes place, the ink is permanently printed and highly resistant to change or fading caused by laundry products. While sublimation dyes yield excellent results when a polyester or polymeric substrate is used, these dyes have a limited affinity for other materials, such as natural fabrics like cotton and wool, or substrates like wood or metal, unless these substrates are coated with a polymeric material.

Accordingly, images produced by heat activated inks comprising sublimation dyes which are transferred onto textile materials having a cotton component do not yield the high quality image experienced when images formed by such inks are printed onto a polyester substrate. Images which are printed using sublimation dyes applied by heat and pressure onto substrates of cotton or cotton and polyester blends yield relatively poor results.

The natural tendency of the cotton fiber to absorb liquid or liquified inks causes the image to lose its resolution and become distorted as the ink is applied to the substrate. Liquid inks other than sublimation inks wick, or are absorbed by, cotton or other absorbent substrates, resulting in printed designs of inferior visual quality, since the printed colors are not properly registered on the substrate.

To improve the quality of images transferred onto substrates having a cotton component or other absorbent component, substrates are surface coated with materials, such as the coatings described in DeVries et. al., U.S. Pat. No. 4,021,591. Application of polymer surface coating materials to the substrate allows the surface coating material to bond the ink layer to the substrate, reducing the absorbency of the ink by the cotton and improving the image quality.

Gross coverage of the substrate with the surface coating material does not match the coating to the image to be printed upon it. The surface coating material is applied to the substrate over the general area to which the image layer formed by the inks is to be applied, such as by spraying the material, or applying the material with heat and pressure from manufactured transfer sheets, which are usually rectangular in shape. To achieve full coverage of the surface coating, the area coated with the surface coating material is larger than the area covered by the ink layer. The surface coating extends from the margins of the image after the image is applied to the substrate, which can be seen with the naked eye. The excess surface coating reduces the aesthetic quality of the printed image on the substrate. Further, the surface coating tends to turn yellow with age, which is undesirable on white and other light colored substrates. Yellowing is accelerated with laundering and other exposure to heat, chemicals or sunlight. A method described in Hale et al., U.S. Pat. No. 5,575,877, involves printing the polymer surface coating material to eliminate the margins experienced when aerosol sprays or similar methods are used for gross application of the polymeric coating material.

Thermal transfer paper can transfer a heat-melt image to a final substrate such as cotton. However, this method has several limitations. First, the entire sheet is transferred, not just the image. Second, such papers are heavily coated with material to bind the heat-melt material on the textile. This material makes the transfer area very stiff. Finally, the laundering durability is not improved to acceptable levels. The thermal transfer paper technology (cited Foto-Wear patent) only creates a temporary bond between the transfer materials and the final substrate. This bond is not durable to washing.

SUMMARY OF THE INVENTION

This invention is a formulation and method of printing an image using ink or a meltable ink layer which comprises colorants, such as dyes or pigments, including sublimation, dye diffusion, heat sensitive dyes, or other dyes, any of which may be referred to herein as colorants. Bonding and/or crosslinking of the printed color image is created by the reaction between one or more compounds selected from each of two chemical groups. The first group comprises compounds with functional groups capable of reacting with active hydrogen, such as isocyanate or epoxy groups. The second group comprises compounds with functional groups containing active hydrogen, such as hydroxyl or amino groups, or compounds with functional groups containing active hydrogen after a conversion process, such as anhydride groups.

To prevent premature or undesired reaction, these functional groups are protected either by chemical blocking, using blocking agents, or by the presence of a physical barrier, such as encapsulating agents. The protecting agents may be removed by the application of heat or other physical means.

The ink layer contains colorants and may include compounds from one or both reactive chemical groups. As shown in FIG. 1, a printer 6 prints an ink image onto a first substrate, which may be paper 9. The image may be produced by the computer 4, and may be received from a scanner 2. The first substrate may have a receiving layer that contains compounds from one or both reactive chemical groups. The temperature required to remove the protecting agents from these chemical groups must be greater than the temperature at which printing onto the medium occurs. The image formed by the printed ink and the material in the receiving layer may be transferred from the substrate, or medium 9, to a final substrate 8 on which the image is to permanently appear, such as by the application of heat and pressure. The temperature presented during the transfer step, or the activation step, of the process, is at or above the temperature necessary to unmask any reaction groups in the ink/receiving layer material. A heat press 10 may be used to perform the transfer. The colorants are permanently bonded to the final substrate along with the other components printed in the form of an image from the ink panel and receiving layer. Compounds with functional groups capable of reacting with active hydrogens, such as isocyanates, are reacted with functional groups containing active hydrogens or functional groups capable of conversion to active hydrogen containing groups.

DESCRIPTION OF THE PREFERRED EMBODIMENTS

Figure 1:
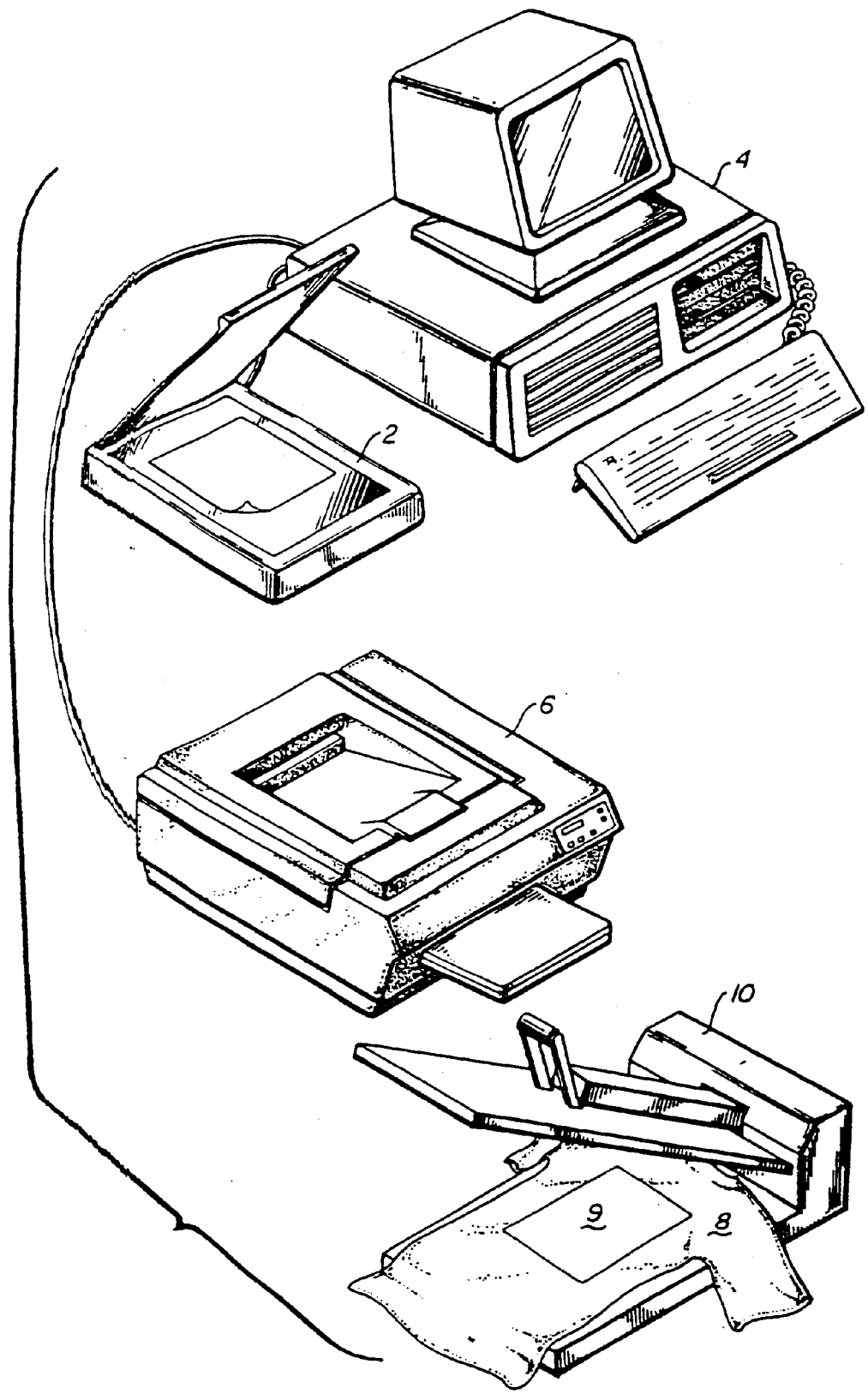
FIG. 1 shows the elements of an embodiment of a printing system which may be used to practice the invention.
Figure 2:
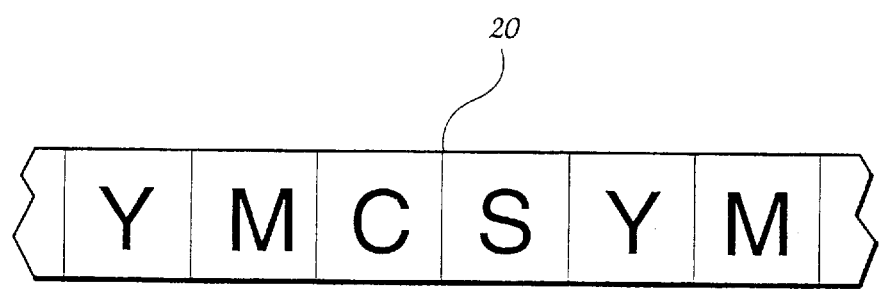
FIG. 2 shows a wax thermal ink ribbon which may be used to practice the invention.

In a preferred embodiment of the present invention, a heat-melt ink ribbon 20 (FIG. 2) is formed composed of a repeating sequence of colored ink panels. A typical pattern of panels is yellow, magenta, cyan, although white, black, or other panels could be interposed. Colorants used for such ink panels may not have an affinity for the final substrate, which may be natural fibers, meaning that the colorants will not bond to the final substrate without a bonding agent. The colorants used in the ink layer may be dyes or pigments. Suitable dyestuffs include, but are not limited to pigments, Acid Dyes, Basic Dyes, Solvent Dyes and Disperse Dyes. The colorants are bonded permanently to the final substrate by means of reaction between other components in the image material, that is, the ink, and a component which is present on the substrate.

Figure 3:
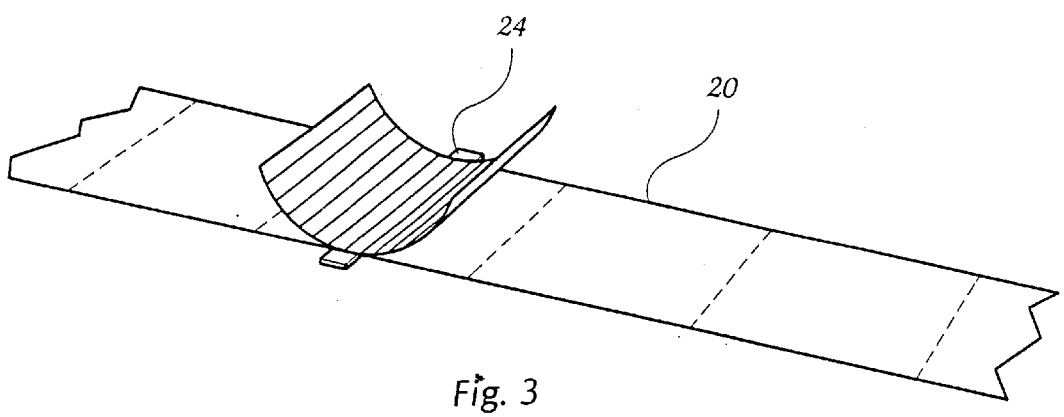
FIG. 3 shows an isolation of a thermal printer head printing the ink from the wax thermal ink ribbon.

According to one embodiment of the invention, a computer-designed image is first digitally melt-transfer printed from at least one ink layer onto a receiver substrate or medium, which may be paper. A thermal printer having a printer head 24 applies heat to a wax thermal ribbon 20 to release the ink layer in the desired pattern and to form an image on the medium. FIG. 3. The thermal printing process operates at a temperature sufficient to thermally release and print the multiple color ink layers from the ribbon, but the temperature is not sufficient to activate bonding and/or cross-linking of the ink layers, either within the ink layer itself, or between the ink layer and the printed medium. After the image is printed, a higher temperature is applied, preferably under pressure, to activate and permanently fix the ink layer onto the medium, or, alternatively, to transfer the image from the medium onto the final substrate as the heat simultaneously activates the image, to react the component and bond and/or cross-link the colorants. The image is permanently bonded to the substrate, and excellent durability can be achieved for the final design image. Appropriate pressure is applied during the transfer process to ensure the proper surface contact of the medium and the final substrate.

Bonding and/or crosslinking of the color images of the present invention are provided by the reaction between compounds selected from each of two chemical groups. The first group comprises compounds with functional groups capable of reacting with active hydrogen, such as isocyanate or epoxy groups. A preferred set of compounds comprising isocyanate groups is referred to as polyisocyanates. The second group comprises compounds with functional groups containing active hydrogen, such as hydroxyl, amino, thiol, carboxylic acid groups, or compounds with functional groups containing active hydrogen after a conversion process, such as carboxylic anhydride groups. A preferred set of compounds comprising hydroxyl groups is referred to herein as polyols.

In most applications, reaction and bonding of the ink or dye layer at the time of printing is not required. The ink will sufficiently attach to the receiver substrate or medium at the time of printing. In the wax thermal example above, the residual wax will sufficiently attach the colorants to the medium to preserve the image for subsequent transfer of the image. Permanent bonding at the time of printing onto the receiving substrate or medium would prevent subsequent transfer of the image from the receiving substrate or medium to the final substrate, and is undesired.

To achieve reaction at the desired time, at least one of the reactive groups is protected either by chemical blocking with blocking agents, or by a physical barrier, such as encapsulating agents. The protecting or blocking agents are preferably removed by the application of heat. Other initiation processes may include, but are not limited to, radiation, chemical, pressure, and/or the combinations thereof.

The ink layer may include compounds from either of the reactive chemical groups. In one embodiment, the ink layer contains polyol compounds. The use of polyols in the present invention meets two primary goals of the invention. As a wax-like material, it supplies the heat-melt component when a wax thermal print system is used, so that thermal digital printing of the ink layer can be achieved. The polyols also supply functional groups having active hydrogens capable of crosslinking with active isocyanate and permanently bonding to the final substrate. The ink layer may also contain polymeric binder material for better adhesion of the polyols on the ribbon.

To further enhance the permanent bonding of the ink layer onto the final substrate, an optional additional panel of binding material may be inserted in the colored panel sequence, either ahead of or behind the colored ink panels. The binding material may contain one or both reactive chemical compounds. The binding material may also contain polymeric material. The printer prints the binding material in the shape of the image, or slightly beyond the image boundary, either directly onto the medium or onto the printed ink image. The ink-binder image is then transferred from the medium to the substrate by the application of heat and pressure, providing enhanced binding of colorant to substrate.

The receiver substrate or medium contains compounds from either of the reactive chemical groups, to set up a reaction with the other group, which is contained in the ink. In one embodiment, the receiving layer which is present on the medium contains polyisocyanate compounds. The receiving layer may include a plasticizer, such as phthalates or adipates, to impart increased flexibility to the substrate. The receiving layer may also include polymeric binder material. In a preferred embodiment, a release layer, which may comprise waxes or polymers, may be present between the receiving layer and the base of the printing medium.

In an additional embodiment, the ink layer contains polyisocyanate compounds. The receiving layer which is present on the medium contains polyol compounds.

The final substrate may be textile substrate materials containing hydroxyl groups and/or primary or secondary amino groups that react with the free isocyanate. Chemical grafting is achieved through copolymerization between the ink layer components and final substrate material, resulting in superior stability and durability. Such materials include cotton, secondary cellulose acetate, rayon, wool, silk, and polyamides such as nylon 6, nylon 6.6 or nylon 12.

Polyols suitable for use in the present invention may have a backbone structure of the polyether, polyester, polythioether, mixed polyester polyether or mixed polyether polythioether classes. Polyols with a polyether backbone are preferred. In general, polyols or mixtures thereof may have an average molecular weight from 500 to 50,000 and preferably, an average molecular weight in the range of 1,000 to 3,000. The resulting composition, with the rest of the components in the ink layer, is suitable for the digital printing process. The average molecular weight of the whole of all polyol compounds is defined as the sum of the product of the molecular weight and the mole fraction of each polyol compound in the mixture. A preferred embodiment of an ink layer comprises a mixture of high molecular weight polyol compounds having molecular weights of 3000 to 10,000, and low molecular weight polyol compounds having molecular weights of not greater than 600.

It will be appreciated by one skilled in the art that the above list of suitable diols, triols, tetrols, etc. is not exhaustive, and that other hydroxyl-containing materials may be used without departing from the spirit of the present invention.

Polyisocyanates suitable for the present invention are aliphatic and/or cycloaliphatic and/or aromatic polyisocyanates. Particularly preferred are polyisocyanates in which all the isocyanate groups are attached to aliphatic carbon atoms. Aliphatic polyisocyanates suitable for the present invention include those having the structure

OCN—(CH2)n—NCO where n is an integer from 2 to 16, and preferably 4 or 6, i.e., tetramethylene diisocyanate and hexamethylene diisocyanate (HDI). Other suitable aliphatic isocyanates are: 1-isocyanato-3-isocyanatomethyl-3,5,5-trimethyl-cyclohexane (known commercially as isophorone diisocyanate (IPDI)), trimethylhexamethylene diisocyanate, the isomeric bis(isocyanatomethyl)-benzenes and toluenes, 1,4-bis (isocyanatomethyl)-cyclohexane, 4,4'-methylenebis (cyclohexylisocyanate), cyclohexane-1,4-diisocyanate, and the like. Such aliphatic polyisocyanates may be used either alone, or in a mixture with one or more of the other aliphatic polyisocyanates listed above.

Examples of aromatic isocyanates suitable for the present invention are 2,4-toluene diisocyanate, 2,6-toluene diisocyanate, commercial mixtures of 2,4- and 2,6-toluene diisocyanate, 4,4'-diphenylmethane diisocyanate, dianisidiene diisocyanate, the isomeric benzene, xylene and naphthalene diisocyanates. Such aromatic polyisocyanates may be used alone or in a mixture with other aromatic polyisocyanates, such as those listed above, or with the aliphatic polyisocyanates listed above.

In place of polyisocyanates, polyisothiocyanates, or compounds containing both isocyanate and isothiocyanate groups may be used, for example, hexamethylene diisothiocyanate, tetramethylene diisothiocyanate, 2,4- and 2,6-toluene diisothiocyanate.

To prevent premature reaction of the polyisocyanates, blocked polyisocyanates may be used. A blocked isocyanate, as used herein, is derived from the reaction of a blocking agent and an isocyanate. Such blocked isocyanates reform the original isocyanate upon removal of the blocking agents such as by heating, or by heating with nucleophilic reagents, they may produce the same products as the reaction of the same nucleophilic reagents with the parent isocyanates. Typically, the unblocking reaction occurs upon the application of heat at or above 120 degrees C.

Common examples of blocking agents include phenols and substituted phenols, alcohols and substituted alcohols, thiols, lactams such as alpha-pyrrolidone, epsilon-caprolactam, mercaptans, primary and secondary acid amides, imides, aromatic and aliphatic amines, active methylene compounds, oximes of aldehydes and ketones and salts of sulfurous acid.

The polyisocyanate and the polyol compounds are preferred to have an average functionality between two and four. The ratio of the equivalents of isocyanate groups to the equivalents of hydroxyl groups may range from 1/2 to 10/1, preferably 1/1 to 2/1.

Catalysts may be included to speed up the cross-linking reaction. Examples of catalysts for the isocyanate/polyol reaction include tertiary amines, such as triethylamine, triethylenediamine, hexahydro-N,N'-dimethyl aniline, tribenzylamine, N-methyl-piperidine, N,N'-dimethylpiperazine; alkali or alkaline earth metal hydroxides; heavy metal ions, such as iron(III), manganese(III), vanadium(V) or metal salts such as lead oleate, lead-2-ethylhexanoate, zinc(II)octanoate, lead and cobalt napththenate, zinc(II)-ethylhexanoate, dibutyltin dilaurate, dibutyltin diacetate, and also bismuth, antimony and arsenic compounds, for example tributyl arsenic, triethylstilbene oxide or phenyldichlorostilbene. Particularly preferred are dibutyl tin catalysts.

Polymeric binder materials may be incorporated into the ink panel, receiving layer, or release layer formulations. These materials may include resins and mixtures thereof. Resins which may be used include rosin and modified rosins, such as calcium, magnesium, and zinc metallic resinates, ester gum of rosin, maleic resins and esters, dimerized and polymerized rosins and rosin modified fumaric resins;

shellac, asphalts, phenolic resins and rosin-modified phenolic resins; alkyd resins; polystyrene resins and copolymers thereof; terpene resins; alkylated urea formaldehyde resins; alkylated melamine formaldehyde resins; polyamide resins; vinyl resins and copolymers thereof, such as polyvinyl acetate, polyvinyl alcohol, ethylene-vinyl acetate, and polyvinyl butyral; ketone resins; acrylic resins, such as polyacrylic acid and polymethacrylic acid; epoxide resins; polyurethane resins; polyester resins; cellulosic resins, such as nitro cellulose, ethyl cellulose, cellulose acetate butyrate and carboxymethyl cellulose.

A thermally expandable ink layer may be produced which comprises a foaming agent. Simultaneous expanding and crosslinking gives a three dimensional image which is permanently bound to the substrate. The height of the image is dependent on the concentration of foaming agent, the temperature and the pressure applied during heat transfer printing.

Any, or all, of the color panels could include foaming agents. These additives are preferred to be incorporated into a white-colored panel which is positioned adjacent to a dark substrate. The color image so produced is vibrant and visible on the dark fabric. These additives may also be used in the binder layer to assist in the release of the image from the paper.

Preferable foaming agents include those which decompose upon heating to release gaseous products which cause the ink layer to expand. Such foaming agents, known as chemical blowing agents or puffing agents include organic expanding agents such as azo compounds, including azobisisobutyronitrile, azodicarbonamide, and diazoaminobenzene, nitroso compounds such as N,N'-dinitrosopentamethylenetetramine, N,N'-dinitroso-N,N'-dimethylterephthalamide, sulfonyl hydrazides such as benzenesulfonyl hydrazide, p-toluenesulfonyl hydrazide, p-toluenesulfonyl azide, hydrazolcarbonamide, acetone-p-sulfonyl hydrazone; and inorganic expanding agents, such as sodium bicarbonate, ammonium carbonate and ammonium bicarbonate azodicarbonamide. A thermally expandable ink layer may be produced which comprises volatile hydrocarbons encapsulated in a microsphere which bursts upon the application of heat. The gaseous products produced upon bursting expand the ink layer.

Thermally expandable microcapsules are composed of a hydrocarbon, which is volatile at low temperatures, positioned within a wall of thermoplastic resin. Examples of hydrocarbons suitable for practicing the present invention are methyl chloride, methyl bromide, trichloroethane, dichloroethane, n-butane, n-heptane, n-propane, n-hexane, n-pentane, isobutane, isophetane, neopentane, petroleum ether, and aliphatic hydrocarbons containing fluorine, such as Freon, or a mixture thereof.

Examples of the materials which are suitable for forming the wall of the thermally expandable microcapsule include polymers of vinylidene chloride, acrylonitrile, styrene, polycarbonate, methyl methacrylate, ethyl acrylate and vinyl acetate, copolymers of these monomers, and mixtures of the polymers of the copolymers. A crosslinking agent may be used as appropriate.

The diameter of the thermally expanded microcapsule is in the range of 0.1–300 microns, and preferably within a range of 0.3–50 microns, with a greater preference of a range of 0.5–20 microns.

EXAMPLE 1

| Ink and/or Receiving Layer Composition | (% Dry Weight) |
|---|---|
| Polyisocyanate | 15–40 |
| Polyol | 50–85 |
| Catalyst | 0–2 |
| Colorant | 0–10 |
| Polymeric Binder | 0–20 |
| Foaming Agent | 0.1–2 |

EXAMPLE 2

| Ink Layer Composition | (% Dry Weight) |
|---|---|
| Polyol | 50–85 |
| Catalyst | 0–2 |
| Colorant | 0–10 |
| Polymeric Binder | 0–20 |
| Foaming Agent | 0–2 |
| Receiving Layer Composition | |
| Polyisocyanate | 15–40 |
| Polymeric Binder | 0–20 |

EXAMPLE 3

| Ink Layer Composition | (% Dry Weight) |
|---|---|
| Polyol | 50–85 |
| Colorant | 0–10 |
| Polymeric Binder | 0–20 |
| Receiving Layer Composition | |
| Polyisocyanate | 15–40 |
| Catalyst | 0–2 |
| Polymeric Binder | 0–20 |
| Foaming Agent | 0–2 |

What is claimed is:

1. A method of digital printing, comprising the steps of:
   a. preparing an ink comprising a colorant, a protecting agent and at least one functional group which reacts with active hydrogen;
   b. supplying a printer with said ink;
   c. printing said ink and forming an image on a substrate comprising at least one compound having at least one functional group containing active hydrogen wherein said protecting agent, during printing of said ink, inhibits a reaction between said at least one compound having at least one functional group which reacts with active hydrogen, and said at least one compound having at least one functional group containing active hydrogen; and
   d. removing said protecting agent and reacting said at least one compound having at least one functional group which reacts with active hydrogen, with said at least one compound having at least one functional group containing active hydrogen, thereby bonding said image to said substrate.

2. A method of digital printing as described in claim 1, wherein said at least one compound having at least one functional group which reacts with active hydrogen is an isocyanate.

3. A method of digital printing as described in claim 2, wherein said at least one compound having at least one functional group containing active hydrogen is a polyol.

4. A method of digital printing as described in claim 3, wherein said protecting agent is removed by the application of heat to said protecting agent.

5. A method of digital printing as described in claim 2, wherein said protecting agent is removed by the application of heat to said protecting agent.

6. A method of digital printing as described in claim 1, wherein said at least one compound having at least one functional group containing active hydrogen is a polyol.

7. A method of digital printing as described in claim 6, wherein said protecting agent is removed by the application of heat to said protecting agent.

8. A method of digital printing as described in claim 1, wherein said at least one compound having at least one functional group which reacts with active hydrogen is an epoxide.

9. A method of digital printing as described in claim 8, wherein said protecting agent is removed by the application of heat to said protecting agent.

10. A method of digital printing as described in claim 1, wherein said protecting agent is removed by the application of heat to said protecting agent.

11. A method of digital printing, comprising the steps of:
   a. preparing an ink comprising a colorant, a protecting agent and at least one functional group which reacts with active hydrogen;
   b. supplying a printer with said ink;
   c. printing said ink and forming an image on a first substrate comprising at least one compound having at least one functional group containing active hydrogen wherein said protecting agent, during printing of said ink, inhibits a reaction between said at least one compound having at least one functional group which reacts with active hydrogen, and said at least one compound having at least one functional group containing active hydrogen;
   d. subsequently transferring said image from said first substrate to a second substrate; and
   e. removing said protecting agent and reacting said at least one compound having at least one functional group which reacts with active hydrogen, with said at least one compound having at least one functional group containing active hydrogen, thereby bonding said image to said second substrate.

12. A method of digital printing as described in claim 11, wherein said at least one compound having at least one functional group which reacts with active hydrogen is an isocyanate.

13. A method of digital printing as described in claim 12, wherein said at least one compound having at least one functional group containing active hydrogen is a polyol.

14. A method of digital printing as described in claim 13, wherein said protecting agent is removed by the application of heat to said protecting agent.

15. A method of digital printing as described in claim 12, wherein said protecting agent is removed by the application of heat to said protecting agent.

16. A method of digital printing as described in claim 11, wherein said at least one compound having at least one functional group containing active hydrogen is a polyol.

17. A method of digital printing as described in claim 16, wherein said protecting agent is removed by the application of heat to said protecting agent.

18. A method of digital printing as described in claim 11 wherein said at least one compound having at least one functional group which reacts with active hydrogen is an epoxide.

19. A method of digital printing as described in claim 18, wherein said protecting agent is removed by the application of heat to said protecting agent.

20. A method of digital printing as described in claim 11, wherein said protecting agent is removed by the application of heat to said protecting agent.

21. A method of digital printing, comprising the steps of:
   a. preparing an ink comprising a colorant, at least one functional group which reacts with active hydrogen, and a protecting agent which inhibits a reaction of said at least one functional group which reacts with active hydrogen;
   b. supplying a printer with said ink;
   c. printing said ink and forming an image on a first substrate;
   d. subsequently transferring said image from said first substrate to a second substrate that comprises at least one compound having at least one functional group containing active hydrogen; and
   e. removing said protecting agent and reacting said at least one compound having at least one functional group which reacts with active hydrogen, with said at least one compound having at least one functional group containing active hydrogen, thereby bonding said image to said second substrate.

22. A method of digital printing as described in claim 21, wherein said at least one compound having at least one functional group which reacts with active hydrogen is an isocyanate.

23. A method of digital printing as described in claim 22, wherein said at least one compound having at least one functional group containing active hydrogen is a polyol.

24. A method of digital printing as described in claim 23, wherein said protecting agent is removed by the application of heat to said protecting agent.

25. A method of digital printing as described in claim 22, wherein said protecting agent is removed by the application of heat to said protecting agent.

26. A method of digital printing as described in claim 21, wherein said at least one compound having at least one functional group containing active hydrogen is a polyol.

27. A method of digital printing as described in claim 26, wherein said protecting agent is removed by the application of heat to said protecting agent.

28. A method of digital printing as described in claim 21 wherein said at least one compound having at least one functional group which reacts with active hydrogen is an epoxide.

29. A method of digital printing as described in claim 28, wherein said protecting agent is removed by the application of heat to said protecting agent.

30. A method of digital printing as described in claim 21, wherein said protecting agent is removed by the application of heat to said protecting agent.

* * * * *